(12) United States Patent
Gao et al.

(10) Patent No.: US 11,848,634 B2
(45) Date of Patent: Dec. 19, 2023

(54) METHOD AND SYSTEM FOR OPERATING A VARIABLE FREQUENCY INDEPENDENT SPEED MOTOR IN AN EXTENDED SPEED RANGE

(71) Applicant: The Boeing Company, Chicago, IL (US)

(72) Inventors: Lijun Gao, Renton, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 17/668,564

(22) Filed: Feb. 10, 2022

(65) Prior Publication Data

US 2022/0294373 A1 Sep. 15, 2022

Related U.S. Application Data

(60) Provisional application No. 63/161,077, filed on Mar. 15, 2021.

(51) Int. Cl.
*H02P 9/14* (2006.01)
*H02P 9/42* (2006.01)

(52) U.S. Cl.
CPC . *H02P 9/14* (2013.01); *H02P 9/42* (2013.01)

(58) Field of Classification Search
CPC .... H02P 9/14; H02P 9/42; H02P 9/007; H02P 27/05; H02P 27/04; H02P 3/18; H02P 6/16; H02J 7/14
See application file for complete search history.

(56) References Cited

U.S. PATENT DOCUMENTS 9,130,494 B2 9/2015 Benson et al.
9,136,782 B2 9/2015 Benson et al.
(Continued)

FOREIGN PATENT DOCUMENTS

CN 111262394 A 6/2020

OTHER PUBLICATIONS

Ruviaro M et al: "A brushless doubly fed induction machine with flat plane rotary transformers", Electrical Machines (ICEM), 2012 XXTH International Conference on, IEEE, Sep. 2, 2012 (Sep. 2, 2012), pp. 23-29, xp032464691 0.
(Continued)

*Primary Examiner* — Joseph Ortega
(74) *Attorney, Agent, or Firm* — PARSONS BEHLE & LATIMER (57) ABSTRACT

A system may include a variable frequency independent speed (VFIS) motor-generator. The system may further include a first power conditioner coupled to a set of stator windings of the VFIS motor-generator and a second power conditioner, distinct from the first power conditioner, coupled to a set of primary windings of a high-frequency transformer, where a set of secondary windings of the high-frequency transformer are coupled to a set of rotor windings of the VFIS motor-generator. A method may include providing a first power signal at the set of stator windings. The method may further include generating a second power signal at the second power conditioner for driving the set of rotor windings, where a shaft speed of the VFIS motor-generator is based on a difference between a first frequency of the first power signal and a second frequency of the second power signal.

20 Claims, 8 Drawing Sheets

(56) References Cited

U.S. PATENT DOCUMENTS

| | | | |
|---|---|---|---|
| 9,588,535 B2 | 3/2017 | Solodovnik et al. | |
| 10,547,269 B2 | 1/2020 | Gao et al. | |
| 10,622,931 B1 | 4/2020 | Gao et al. | |
| 2015/0115108 A1 | 4/2015 | Benson et al. | |
| 2019/0264617 A1* | 8/2019 | Barmichev | F02K 5/00 |
| 2019/0356261 A1* | 11/2019 | Gao | H02P 9/14 |

OTHER PUBLICATIONS

European Patent Office; Extended Search Report for Application No. 22160209.7 dated Jul. 27, 2022.

* cited by examiner

METHOD AND SYSTEM FOR OPERATING A VARIABLE FREQUENCY INDEPENDENT SPEED MOTOR IN AN EXTENDED SPEED RANGE

CROSS-REFERENCE TO RELATED APPLICATIONS

This application, under 35 U.S.C. § 119, claims the benefit of U.S. Provisional Patent Application No. 63/161,077 filed on Mar. 15, 2021, and entitled "Method and System for Operating a Variable Frequency Independent Speed Motor in an Extended Speed Range," the contents of which are hereby incorporated by reference herein.

FIELD OF THE DISCLOSURE

This disclosure is generally related to the field of operating a variable frequency independent speed (VFIS) motor-generator and, in particular, to operating a VFIS motor-generator in an extended speed range for both driving and regenerative modes.

BACKGROUND

Power conditioners may be coupled with synchronous and nonsynchronous motor-generators to perform the functions of driving the motor-generator with an alternating current (AC) power signal while in a driving mode and converting regenerative AC power into a direct current (DC) power signal while in a regenerative mode.

Power conditioners may be limited to a finite operational frequency range while operating in a driving mode. When implemented with a typical synchronous or asynchronous motor, the rotation of a motor shaft may also be limited to the operational frequency range of the power conditioner. The limited frequency range may be undesirable, particularly in applications where temporary high rotations per minute (RPMs) are likely, such as an aircraft taking off, a race car sprinting, or a ship changing direction.

Power conditioners may also be limited in the frequencies that regenerative power can be harvested while in a regenerative mode. For example, when the RPMs drop below a minimum regenerative frequency, a frequency of a regenerative power signal may be too low to perform an effective power conversion. Hydraulic braking may be used instead of regeneration which may cause the energy produced by a back-driven load to dissipate as heat rather than storing it in a usable form. Other disadvantages may exist.

SUMMARY

Disclosed are systems and methods that may overcome at least one of the shortcomings of typical power conditioner setups. In an example, a system includes a VFIS motor-generator having a stator with a set of stator windings, a rotor with a set of rotor windings, and a high-frequency transformer having a set of primary windings on the stator and a set of secondary windings on the rotor, where the set of secondary windings are coupled to the set of rotor windings. The system further includes a first power conditioner coupled to the set of stator windings. The system also includes a second power conditioner, distinct from the first power conditioner, coupled to the primary winding.

In some examples, a first power signal generated by the first power conditioner induces a first rotating magnetic field at the set of stator windings, a second power signal generated by the second power conditioner induces a second rotating magnetic field at the set of rotor windings, and a shaft speed is based on a difference between a first frequency of the first power signal and a second frequency of the second power signal. In some examples, the shaft speed is the difference between the first frequency and the second frequency divided by a number of pole pairs.

In some examples, the first power conditioner is configured to generate a constant frequency AC power signal while a shaft frequency is less than a minimum regeneration frequency and the second power conditioner is configured to generate a variable frequency AC power signal having a positive 3-phase sequence while the shaft frequency is less than the minimum regeneration threshold frequency. In some examples, the first power conditioner is configured to generate a variable frequency AC power signal while a shaft frequency is greater than a minimum regeneration frequency and less than a maximum operational frequency of the first power conditioner and the second power conditioner is configured to generate a DC power signal while the shaft frequency is greater than the minimum regeneration frequency and less than the maximum operational frequency. In some examples, the first power conditioner is configured to generate a constant frequency AC power signal between a minimum regenerative frequency and a maximum operational frequency of the first power conditioner while a shaft frequency is greater than the maximum operational frequency and the second power conditioner is configured to generate a variable frequency AC power signal having a negative 3-phase sequence while the shaft frequency is greater than the maximum operational frequency.

In some examples, the first power conditioner is configured to generate a constant frequency AC power signal between a minimum regenerative frequency and a maximum operational frequency of the first power conditioner while a shaft frequency is greater than a minimum regeneration frequency and the second power conditioner is configured to generate a variable frequency AC power signal having a negative 3-phase sequence while the shaft frequency is greater than the minimum regeneration frequency.

In some examples, the first power conditioner is configured to generate a constant frequency AC power signal between a minimum regenerative frequency and a maximum operational frequency of the first power conditioner while a shaft frequency is less than a maximum operational frequency of the first power conditioner and the second power conditioner is configured to generate a DC power signal while the shaft frequency is less than the maximum operational frequency.

In some examples, the first power conditioner is configured to operate in a regenerative mode, the second power conditioner is configured to generate a variable frequency AC power signal having a positive 3-phase sequence while a shaft frequency is less than the minimum regeneration threshold frequency, and a combination of the variable frequency AC power signal and the shaft frequency is greater than or equal to the minimum regeneration threshold frequency. In some examples, the first power conditioner is configured to operate in a regenerative mode and the system further includes a battery, where the first power conditioner is configured to generate a DC power signal to charge the battery when in the regenerative mode.

In some examples, the system includes a battery coupled to the first power conditioner and the second power conditioner and a charger coupled to the battery, where the charger is configured to charge the battery using a power source. In some examples, the system includes an encoder configured to measure a shaft phase and a shaft frequency and to communicate the shaft phase and the shaft frequency to the first power conditioner and the second power conditioner. In some examples, the first power conditioner and the second power conditioner each include one or more inverters, one or more rectifiers, or a combination thereof. In some examples, the VFIS motor-generator is incorporated into a vehicle having regenerative power harvesting capabilities.

In an example, a system includes a VFIS motor-generator having a stator with a set of stator windings and a rotor with a set of rotor windings. The system further includes a first power conditioner configured to generate a first power signal for driving the set of stator windings when operating in a driving mode and configured to generate a DC power signal for charging a battery when operating in a regenerative mode. The system also includes a second power conditioner configured to generate a second power signal for driving the set of rotor windings.

In some examples, the system includes a battery coupled to the first power conditioner and to the second power conditioner and a charger configured to connect to an electrical power source and to charge the battery using the electrical power source. In some examples, the system includes a high-frequency transformer including a primary winding positioned on the stator and a secondary winding positioned on the rotor, where the second power signal is communicated to the set of rotor windings via the high-frequency transformer.

In an example a method includes providing a first power signal at a set of stator windings of a VFIS motor-generator, wherein the set of stator windings is coupled to a first power conditioner. The method further includes generating a second power signal at a second power conditioner for driving a set of rotor windings of the VFIS motor-generator, where a shaft speed of the VFIS motor-generator is a difference between a first frequency of the first power signal and a second frequency of the second power signal divided by a number of pole pairs of the VFIS motor-generator.

In some examples, the first power signal is a driving AC power signal, where a shaft frequency is greater than a maximum operational frequency of the first power conditioner, and where the second power signal is an AC power signal having a negative 3-phase sequence. In some examples, the first power signal is a regenerative AC power signal, where a shaft frequency is less than a minimum regenerative frequency, and where the second power signal is an AC power signal having a positive 3-phase sequence.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Figure 1:
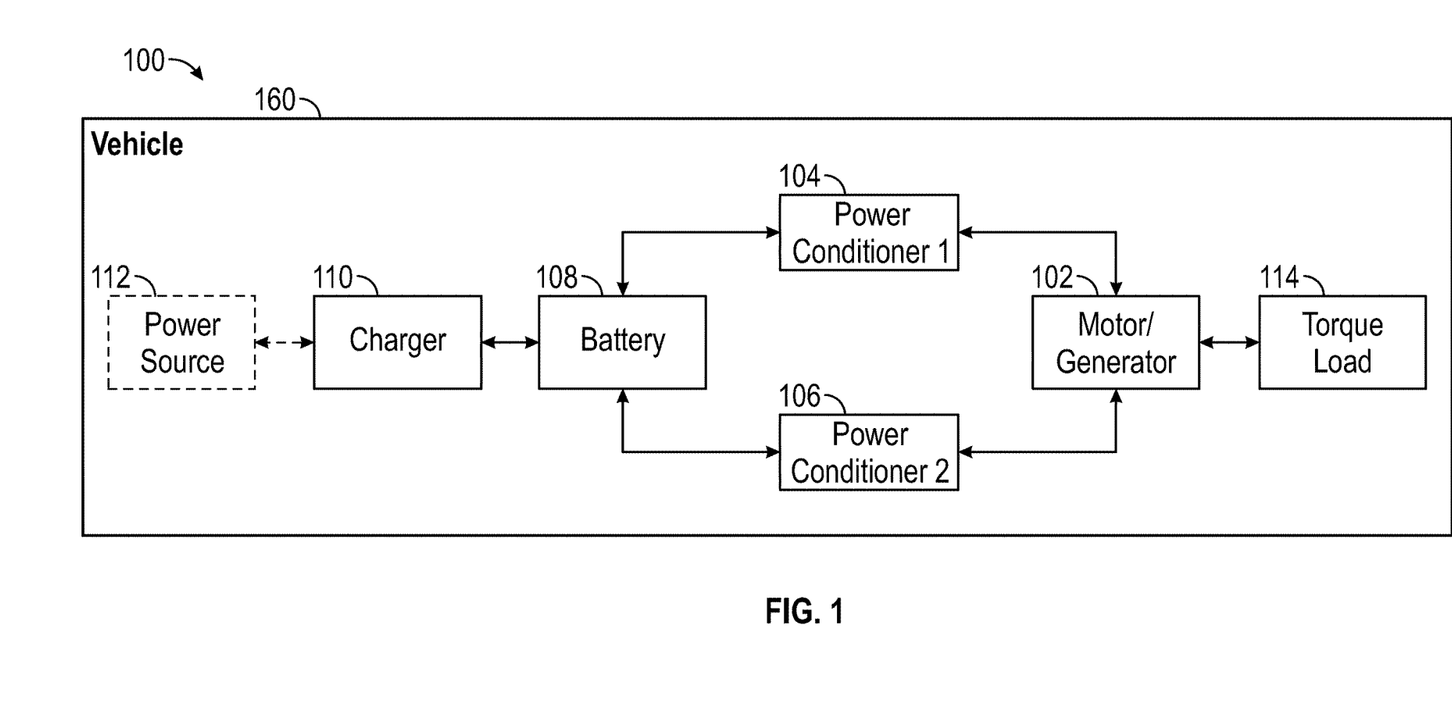
FIG. 1 is a schematic diagram depicting an example of a system for operating a VFIS motor-generator in an extended speed range.

Referring to FIG. 1, an example of a system 100 for operating a VFIS motor-generator 102 in an extended speed range is depicted. The system 100 may include the VFIS motor-generator 102, a first power conditioner 104, a second power conditioner 106, a battery 108, and a charger 110. The charger 110 may be configured to connect to a power source 112. The VFIS motor-generator 102 may be coupled to a torque load 114, such as a propulsion system, a surface control actuator, another type of actuation device, or the like. The system 100 may be incorporated into a vehicle 160, such as an aircraft, automobile, ship, or another type of motorized vehicle.

The VFIS motor-generator 102 may include any type of motor designed to actively drive both a set of rotor windings and a set of stator windings. By changing a frequency and/or direction of a field generated at the rotor windings, the VFIS motor-generator 102 may achieve a rotational frequency that is independent from a frequency of a power signal used to drive its windings. The VFIS motor-generator 102 may also be back-driven and used as a generator for regenerative power applications. The VFIS motor-generator may be a 3-phase motor. An example of a VFIS motor-generate usable with the descriptions provided herein in described further in U.S. Pat. No. 10,547,269, issued on Jan. 28, 2020, and entitled "Variable Frequency Independent Speed Motor," the contents of which are incorporated by reference herein in their entirety.

The first power conditioner 104 and the second power conditioner 106 may include circuitry and devices for converting power signals. For example, when in a driving mode, a DC power signal from the battery 108 may be converted into AC power signals for driving the VFIS motor-generator 102. When in a regenerative mode, an AC power signal generated by the VFIS motor-generator 102 may be converted into a DC power signal for charging the battery 108. The first power conditioner 104 and the second power conditioner 106 are further described herein.

The battery 108 may include any device for storing electrical charge. As a non-limiting example, the battery 108 may include a lead-acid battery, a lithium-ion battery, a rechargeable alkaline battery, a capacitor, a super-capacitor, another type of electrical charge storage device, or combinations thereof. Further, the battery 108 may include multiple cells, e.g., a battery pack. During operation, the battery 108 may be charged by regenerative power received from the first power conditioner 104 and/or the second power conditioner 106 or by the charger 110.

The charger 110 may be configured to connect to the power source 112. The power source 112 may be external to and/or remote from the vehicle 160. For example, in cases where the vehicle is an aircraft, the power source 112 may be a ground-based power supply. As another example, in cases where the vehicle is an automobile, the power source 112 may be a car charging station or a consumer electrical outlet. In some cases, the power source 112 may be incorporated within the vehicle 160. For example, in the case of a ship, the power source 112 could be an on-board power generation system.

Because the VFIS motor-generator 102 may be driven by two power signals (a first power signal to drive a set of rotor windings and a second power signal to drive a set of stator windings) the first power conditioner 104 and the second power conditioner 106 may be able to effectively combine their output power signals to operate the VFIS motor-generator 102 in a frequency range that extends past the individual capabilities of either the first power conditioner 104 or the second power conditioner 106, when taken alone. Further, during regeneration, the first power conditioner 104 and the second power conditioner 106 may be able to effectively combine their output power signals to operate in a regenerative power mode outside of the regenerative capability range of either the first power conditioner 104 or the second power conditioner 106. This extended speed range is further described herein.

Figure 2:
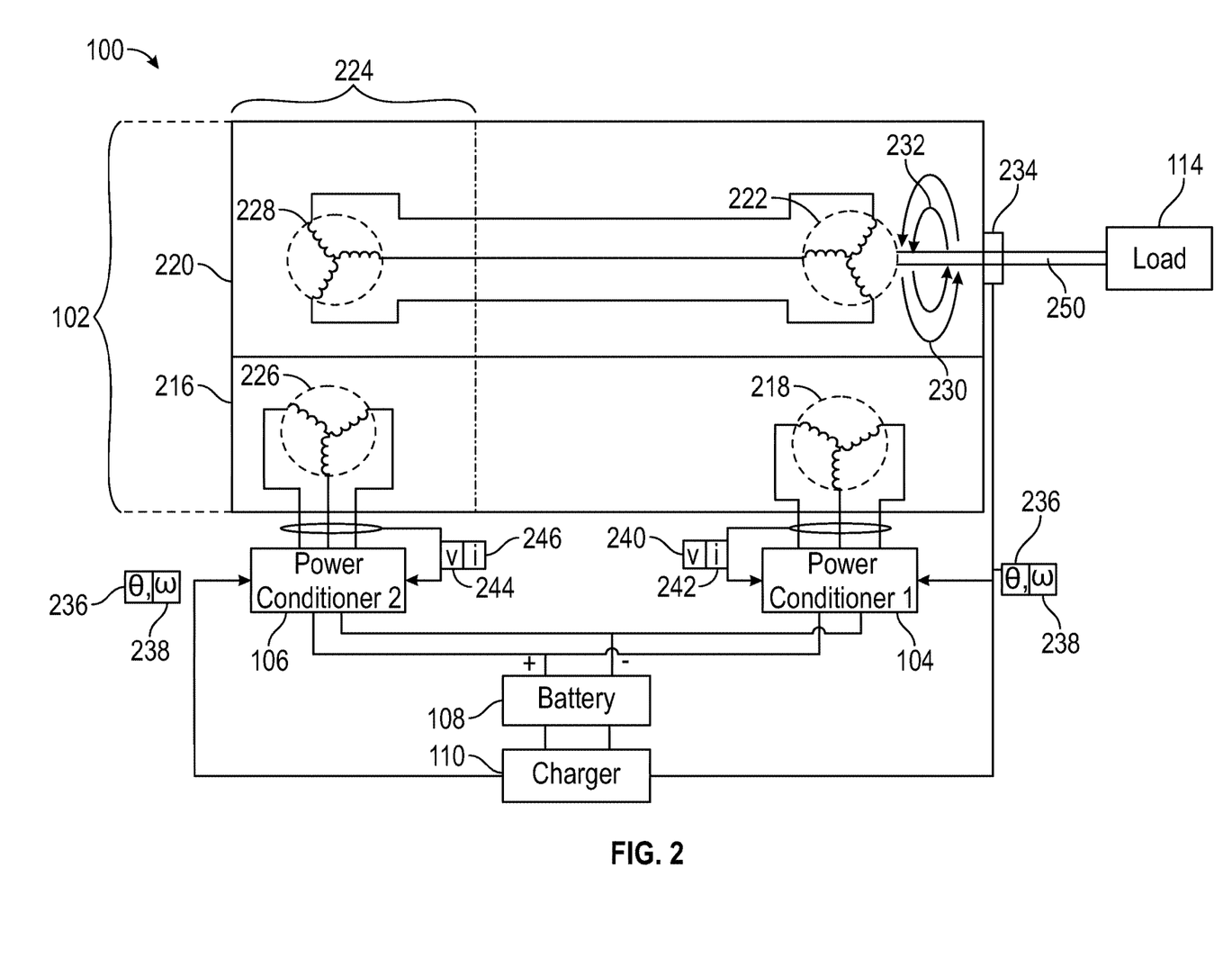
FIG. 2 is a schematic diagram depicting an example of a system for operating a VFIS motor-generator in an extended speed range.

Referring to FIG. 2, an example of a system 100 for operating a VFIS motor-generator in an extended speed range is depicted. FIG. 2 may provide more detail showing how the first power conditioner 104 and the second power conditioner 106 are coupled to the VFIS motor-generator 102.

The VFIS motor-generator 102 may include a stator 216 and a rotor 220. The stator 216 may have a set of stator windings 218. The rotor 220 may have a set of rotor windings 222. The VFIS motor-generator 102 may further include a high-frequency transformer 224 having a set of primary windings 226 on the stator 216 and a set of secondary windings 228 on the rotor 220. The set of secondary windings 228 may be connected to the set of rotor windings 222.

While in a driving mode, the first power conditioner 104 may be configured to generate a power signal for driving the set of stator windings 218. The power signal may induce a first rotating magnetic field 230 at the set of stator windings 218. The second power conditioner 106 may be configured to generate a power signal for driving the set of rotor windings 222. The power signal generated by the second power conditioner 106 may be transmitted to the set of rotor windings 222 via the high-frequency transformer 224 and may induce a second rotating magnetic field 232 at the set of rotor windings 222. The combination of the first rotating magnetic field 230 and the second rotating magnetic field 232 may cause a shaft 250 of the VFIS motor-generator 102 to rotate.

Frequencies of the first rotating magnetic field 230 and the second rotating magnetic field 232 may be additive and/or subtractive when applied to the shaft 250. In FIG. 2, they are shown as being additive with both the first rotating magnetic field 230 and the second rotating magnetic field 232 rotating in the same direction. As used herein, a power signal generated by the second power conditioner 106 that causes the second rotating magnetic field 232 to rotate in the same direction as the shaft 250 is referred to as having a positive frequency (or a positive 3-phase sequence) and a power signal generated by the second power conditioner 106 that causes the second rotating magnetic field 232 to rotate in an opposite direction than the shaft is referred to as having a negative frequency (or a negative 3-phase sequence). Thus, a speed of the shaft 250 (also referred to herein as a shaft frequency) may be based on a difference between the frequency of the power signal generated by the first power conditioner 104 and the frequency of the power signal generated by the second power conditioner 106. In some cases, the VFIS motor-generator may include multiple pole pairs. In that case, the shaft frequency may be the difference between the two power signals divided by the number of pole pairs.

By applying a positive 3-phase sequence AC power signal to the set of rotor windings 222, a shaft frequency may be lower than a frequency that would be produced by the first rotating magnetic field 230 alone. By applying a DC power signal to the set of rotor windings 222, the shaft frequency may correspond to a frequency of the first rotating magnetic field 230. By applying a negative 3-phase sequence AC power signal to the set of rotor windings 222, the shaft frequency may be greater than a frequency that would be produced by the first rotating magnetic field 230 alone. This may enable the VFIS motor-generator 102 to be operated at a frequency (having a shaft frequency) that is higher than an operational bandwidth of either the first power conditioner 104 or the second power conditioner 106 when taken alone. In some cases, when the first power conditioner 104 and the second power conditioner 106 have a same operational frequency range, the frequency capacity of the shaft may be doubled as compared to a system that may have a single power conditioner.

While in a regeneration mode, the shaft 250 may be driven (or reverse-driven) by the torque load 114. Rotation of the shaft 250 may result in rotation of the rotor 220, which may generate a regenerative AC power signal at the set of stator windings 218. The first power conditioner 104 may convert the regenerative AC power signal into a DC power signal that may be used to charge the battery 108. During regeneration, the second power conditioner 106 may generate a power signal for driving the set of rotor windings 222. As with the driving mode, when in the regenerative mode, the set of rotor windings 222 may be driven with a positive sequence 3-phase AC signal, a DC signal, or a negative sequence 3-phase AC signal. Because the second rotating magnetic field 232 rotates relative to a speed of the shaft 250, a frequency the second rotating magnetic field 232 may be greater than a frequency of the rotating shaft 250. This may enable regeneration to occur even at shaft speeds that are below a minimum regeneration frequency of the first power conditioner 104.

The first power conditioner 104 and the second power conditioner 106 may control their respective output power signals based on signals measured within the VFIS motor-generator 102 signals. For example, the system 100 may include an encoder 234 that may communicate a shaft phase 236 and a shaft frequency 238 to both the first power conditioner 104 and the second power conditioner 106. A first voltage 240 and a first current 242 of a power signal present on the set of stator windings 218 may be measured and provided to the first power conditioner. A second voltage 244 and a second current 246 present on the set of primary windings 226 of the high-frequency transformer 224 may be measured and provided to the second power conditioner 106.

Figure 3:
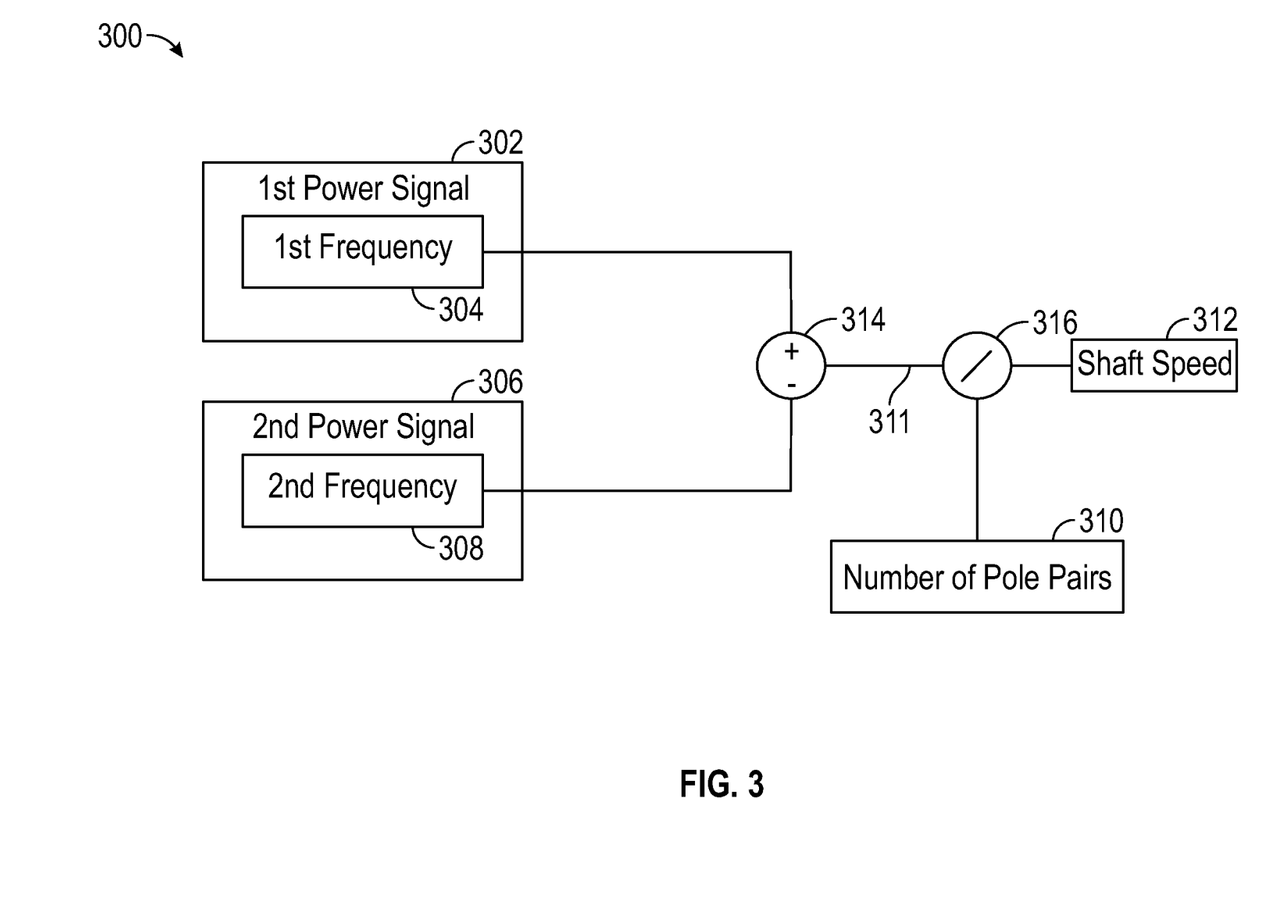
FIG. 3 is a functional diagram depicting an example of relations between power signals and a shaft speed.

Referring to FIG. 3, an example of a relationship 300 between a first power signal 302, a second power signal 306, and a shaft speed 312 is depicted. The first power signal 302 may have a first frequency 304 and the second power signal 306 may have a second frequency 308. The functional relationship 300 may be a two-directional function. In a first direction, which may be associated with a driving mode, the first power signal 302 in combination with the second power signal 306 may determine the shaft speed 312. In a second direction, which may be associated with a regenerative mode, the shaft speed 312 in combination with the second power signal 306 may determine the first power signal 302.

In the first direction, the functional relationship 300 may include a difference 314 between the first frequency 304 and the second frequency 308. The difference 314 may be divided at a multiplier 316 by a number of pole pairs 310 to resulting in a shaft frequency 311. In an example, if the shaft speed has the units RPM (revolutions per minute), then the shaft frequency may be multiplied by 60 seconds (i.e., one minute), which would result in the shaft speed equaling the shaft frequency 311 multiplied by 60 and dividing the result by the number of pole pairs 310. Without the factor 60 seconds, the shaft frequency 311 may be in the unit of revolutions/second.

In the second direction, the first frequency 304 may be the result of an algebraic sum of the shaft frequency 311 and the second frequency 308. The shaft frequency 311 may be the result of the shaft speed 312 multiplied at the multiplier 316 by the number of pole pairs 310. In both cases, either driving or regenerative, the relationship may be mathematically the same.

Figure 4:
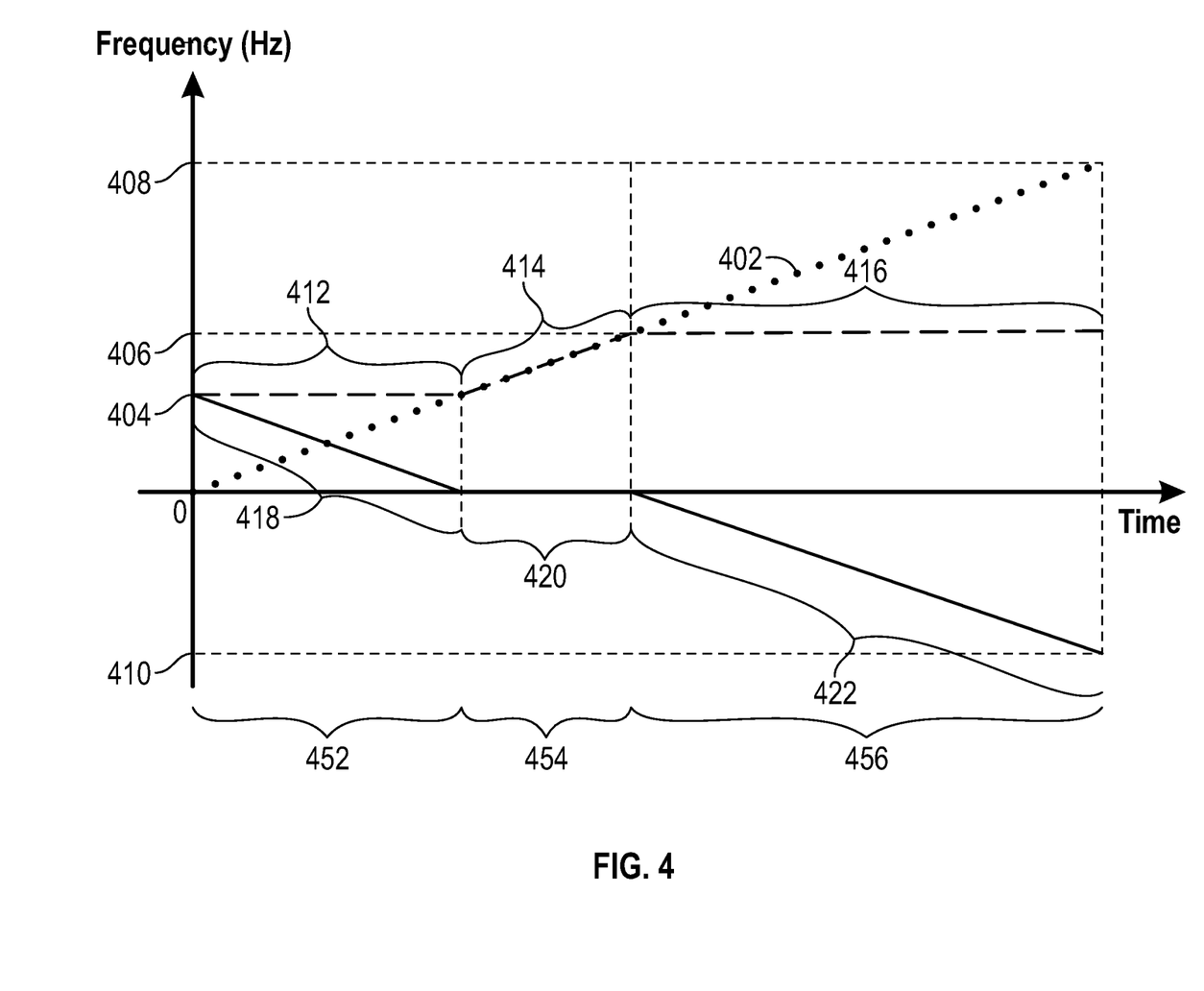
FIG. 4 is a graph depicting an example of relations between power signals and a shaft speed.

Referring to FIG. 4, a graph depicting an example of relationships between power signals and a shaft frequency 402 is depicted. In FIG. 4, and subsequent figures, the shaft frequency 402 is depicted as continuously increasing over time. However, this is for descriptive purposes. In practice, the shaft frequency 402 may vary depending on a stage of usage of the VFIS motor-generator 102 (e.g., a stage of a flight mission profile, such as taxi, takeoff, climb, cruise, descent, etc.).

FIG. 4 shows several different threshold frequencies including a minimum regeneration frequency 404, a maximum operational frequency 406 of the first power conditioner 104, a maximum shaft frequency 408 of the VFIS motor-generator 102, and a maximum negative 3-phase sequence operational frequency of the second power conditioner 106 (depicted as a minimum operational frequency 410 in FIG. 4). In many applications, the absolute values of the maximum operational frequency 406 and the minimum operational frequency 410 may be equal because the maximum achievable frequency of both the power conditioners 104, 106 may be limited by the same types of the semiconductor devices. The minimum regeneration frequency 404 represents a threshold level for regenerative power to be effectively harvested from shaft rotation. At this frequency, typical existing motor-generator regeneration processes may cease power harvesting operations, and the vehicle braking process may rely on other mechanisms, for example, hydraulic braking, which may dissipate the shaft energy as heat. The operational frequencies 404, 406, 408, 410 may represent frequency thresholds that mark the boundaries of the design parameters of their respective components. As seen in FIG. 4, the shaft frequency 402 of the VFIS motor-generator 102 may be operated at frequencies that exceed the maximum operational frequency 406 of the first power conditioner 104. Different stages of operations may be utilized as the shaft frequency 402 increases.

Operation of the system 100 may be divided into three regions 452, 454, 456 based on a shaft frequency 402, which may run from 0 to the maximum shaft frequency 408 (which may equal twice the maximum operational frequency 406 of the first power conditioner 104, if both the power conditioners 104, 106 have the same maximum operational frequency).

In a first region 452, the shaft frequency 402 may range from 0 to the minimum regeneration frequency 404. Within the first region 452, the power conditioners 104, 106 may operate in a driving mode (with the first power conditioner 104 powering the set of stator windings 218) or a regeneration mode (with the first power conditioner 104 receiving power from the set of stator windings 218).

In the first region 452, the driving mode may be referred to as a pseudo-sub-synchronous mode. In this mode, the shaft frequency 402 may be lower than a constant frequency AC power signal 412 generated by the first power conditioner 104 (which may be held constant at the minimum regeneration frequency 404), hence the term "sub" is used for this mode. Yet, the shaft frequency 402 may still synchronize with the combined frequency effect of the constant frequency AC power signal 412 of the first power conditioner 104 and a variable frequency AC power signal 418 generated by the second power conditioner 106. Therefore, it may be referred to as "pseudo-sub" synchronous mode. The second power conditioner 106 may operate at a positive sequence with a frequency anywhere from 0 to the minimum regeneration frequency 404.

In a first driving sub-mode shown in FIG. 4, in the first region 452, the first power conditioner 104 may generate the constant frequency AC power signal 412. The constant frequency AC power signal 412 may be equal to the minimum regeneration frequency 404 as shown. In some cases, the constant frequency AC power signal 412 may be slightly higher than the minimum regeneration frequency 404. The second power conditioner 106 may generate the variable frequency AC power signal 418 having a positive 3-phase sequence. The shaft frequency 402 can smoothly increase from 0 to the minimum regen frequency (e.g., as part of a starting process) with the help of the second power conditioner 106 while the first power conditioner 104 produces the constant frequency AC power signal 412. Based on the functional relationship described with reference to FIG. 3, the variable frequency AC power signal 418 may be decreased as the shaft frequency 402 increases in order to maintain the constant frequency AC power signal 412 at or above the minimum regeneration frequency 404. The assistance provided by the second power conditioner 106 by generating the variable AC power signal 418 represents an advantage over systems that rely on only a single power conditioner.

In a second driving sub-mode, an operational frequency between 0 and the minimum regeneration frequency 404 may be chosen. The variable frequency AC power signal 418 may be selected based on the functional relationship described with respect to FIG. 3 to enable the shaft frequency 402 to equal the chosen frequency. In other words, the shaft frequency 402 need not increase over time, as shown in FIG. 4, but may be selected to be a constant speed between 0 and the minimum regeneration frequency 404. The same concept may apply to each of the regions 452, 454, 456. For example, within each of these regions, the shaft frequency 402 may increase over time as depicted in FIG. 4 or may be chosen as a constant frequency within the applicable region.

In the first region 452, the regeneration mode may be referred to as an extended regeneration mode. In this mode when the shaft frequency 402 changes from the minimum regeneration frequency 404 to 0 (e.g., braking until a complete stop), a frequency of a signal received at the first power conditioner 104 may remain at or slightly higher than the minimum regeneration frequency 404 by changing the variable frequency AC power signal 418 of the second power conditioner 106 from 0 to the minimum regeneration frequency 404. This concept repeats through FIGS. 5 and 6 and is further described with reference to FIG. 8.

By maintaining the constant frequency AC power signal 412 at a frequency that equals or exceeds the minimum regeneration frequency 404, the system 100 may be operated in a way that enables power regeneration at any time, even when the shaft frequency 402, alone, is too low to enable regenerative power to be harvested.

In a second region 454, the shaft frequency 402 may be greater than the minimum regeneration frequency 404 and less than the maximum operational frequency 406 of the first power conditioner 104. During a driving mode in this region, the first power conditioner 104 may generate a variable frequency AC power signal 414. The term variable frequency, as used herein, means that the frequency may fall anywhere between an upper limit (e.g., the maximum operational frequency 406) and a lower limit (e.g., the minimum regeneration frequency 404) and/or may increase or decrease along with the shaft frequency 402. The second power conditioner 106 may generate a DC power signal 420. In this state, the set of rotor windings 222 may operate as a constant magnetic field and the VFIS motor-generator 102 may emulate a typical synchronous motor.

During a regeneration mode in the second region 454, the shaft frequency 402 may change from the maximum operational frequency 406 of the first power conditioner 104 to the minimum regeneration frequency 404 due to a braking. The frequency of the variable frequency AC power signal 414 (which in the case of regeneration may be produced by rotation of the shaft 250 by the load 114) may correspond to the shaft frequency 402 and the second power conditioner 106 may continually produce the DC power signal 420. As described with reference to the first region 452, in the second region 454, during either the driving mode or the regeneration mode, sub-modes such as continuously changing speed operation or fixed speed operation are applicable.

In a third region 456, the shaft frequency 402 may be greater than the maximum operational frequency 406 of the first power conditioner 104 and less than the maximum shaft frequency 408 (or two times the maximum operational frequency 406). In this region, a range of the shaft frequency 402 is considered to be extended because it is greater than the maximum operational frequency 406 of the first power conditioner. In a driving mode, the third region 456 may be referred to as a pseudo-super synchronous mode. In this mode, the shaft frequency 402 may be higher than the operational frequencies of either of the power conditioners 104, 106. Therefore, it may be referred to as "super." Yet, because the shaft frequency may be synchronized with the combined frequency effect a constant frequency AC power signal 416 and a variable frequency AC power signal 422, the mode may be referred to as "pseudo-super". In the pseudo-super-synchronous mode, the first power conditioner 104 may generate a constant frequency AC power signal 416, which may be at its maximum operational frequency 406 as shown in FIG. 4, or may be somewhere between the minimum regeneration frequency 404 and the maximum operational frequency 406. The second power conditioner 106 may generate a variable frequency AC power signal 422 having a negative 3-phase sequence. Based on the functional relationship described in FIG. 3 the negative 3-phase sequence may be additive with the constant frequency AC power signal 416, enabling the shaft to be operated at a frequency that is higher than the maximum operational frequency 406 of the first power conditioner 104. Thus, by having two power conditioners attached to a VFIS motor-generator 102, the system 100 may have an extended speed range.

For a regeneration mode in the third region 456, the shaft frequency 402 may change from the maximum shaft frequency 408 to the maximum operational frequency 406 due to a vehicle braking process. The frequency of the constant frequency AC power signal 416 (which in the case of regeneration may be produced by rotation of the shaft 250 by the load 114) may correspond to the shaft frequency 402 and the second power conditioner 106 may produce the variable frequency AC power signal 422 having a negative 3-phase sequence in order to extend the range of the shaft speed 402. As described previously, in the third region 456, during either the driving mode or the regeneration mode, sub-modes such as continuously changing speed operation or fixed speed operation are applicable.

Figure 5:
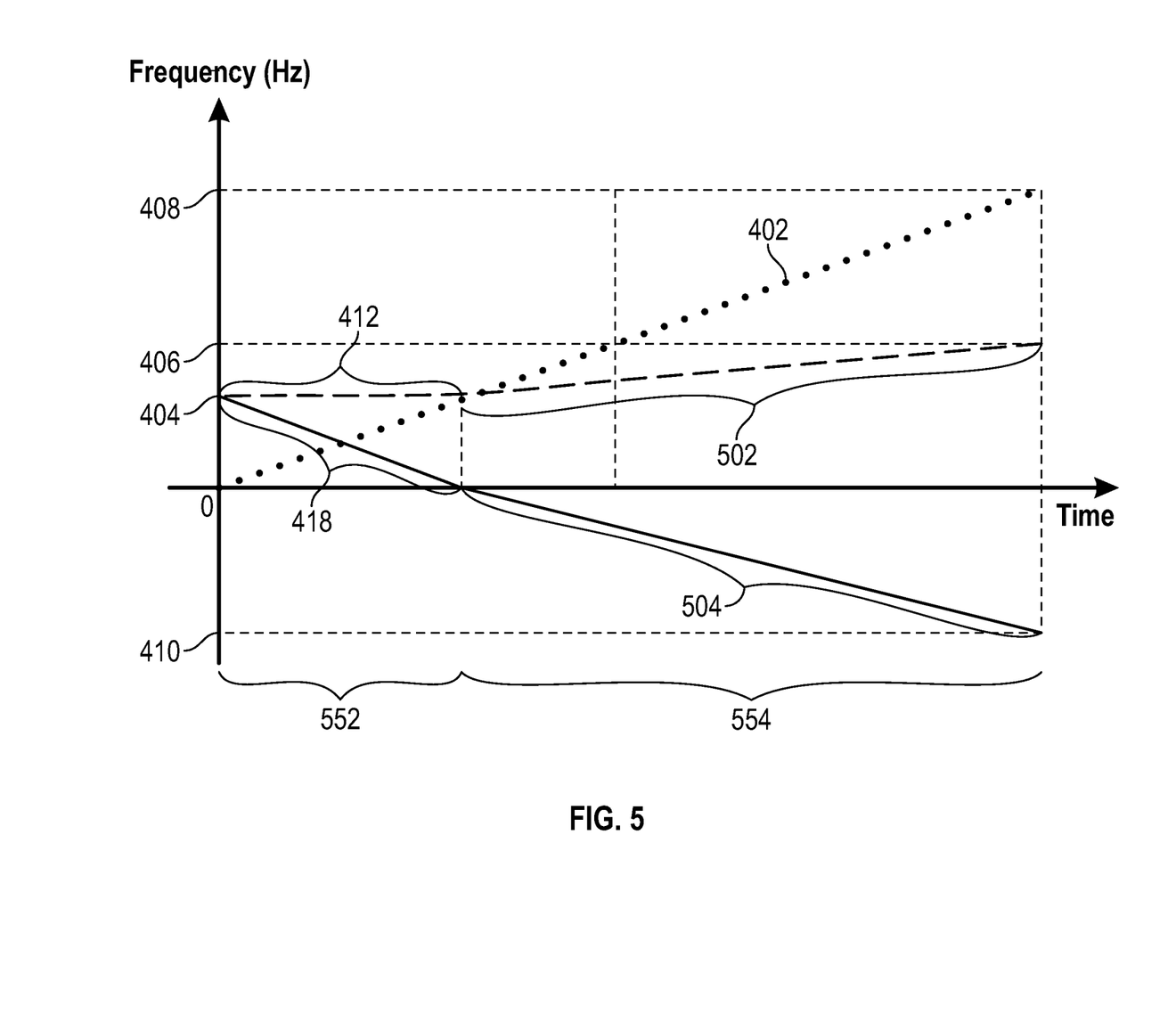
FIG. 5 is a graph depicting an example of relations between power signals and a shaft speed.

Referring to FIG. 5, a graph depicts an example of relationships between power signals and a shaft frequency 402. Unlike FIG. 4, the example of FIG. 5 may include two regions 552, 554 instead of three as in FIG. 4. The second region 454 described with reference to FIG. 4, where the VFIS motor-generator 102 is operated as a typical synchronous motor, may be omitted.

In the first region 552, the shaft frequency 402 may be less than the minimum regeneration frequency 404. As described with respect to the first region 452, in the first region 552 during a driving mode, the power conditioners 104, 106, may be driven in a pseudo-sub-synchronous mode. In a first driving sub-mode, the first power conditioner 104 may generate a constant frequency AC power signal 412 that is equal to the minimum regeneration frequency 404, as shown, or in some cases the constant frequency AC power signal 412 may be slightly higher than the minimum regeneration frequency 404. The second power conditioner 106 may generate a variable frequency AC power signal 418 having a positive 3-phase sequence. The variable frequency AC power signal 418 may be decreased as the shaft frequency 402 increases in order to maintain the constant frequency AC power signal 412 at or above the minimum regeneration frequency 404. In this way, the example of FIG. 5 is similar to the example of FIG. 4. In a second driving sub-mode, an operational frequency between 0 and the minimum regeneration frequency 404 may be chosen. The variable frequency AC power signal 418 may be selected based on the functional relationship described with respect to FIG. 3 to enable the shaft frequency 402 to equal the chosen frequency. This regeneration sub-mode is further described with reference to FIG. 8.

In a second region 554, the shaft frequency 402 may be greater than a minimum regeneration frequency 404 and no greater than the maximum shaft speed 408. In this region, a range of the shaft frequency 402 is considered to be extended because it is greater than the maximum operational frequency 406 of the first power conditioner. In a driving mode, the third region 456 may be referred to as a pseudo-super synchronous mode. The first power conditioner 104 may generate a constant frequency AC power signal 502 that may fall between the minimum regeneration frequency 404 and the maximum operational frequency 406 of the first power conditioner 104. The second power conditioner 106 may generate a variable frequency AC power signal 504 having a negative 3-phase sequence while the shaft frequency 402 is greater than the minimum regeneration frequency 404.

For a regeneration mode in the second region 554, the shaft frequency 402 may change from the maximum shaft frequency 408 to the maximum operational frequency 406 due to a vehicle braking process. The frequency of the constant frequency AC power signal 416 (which in the case of regeneration may be produced by rotation of the shaft 250 by the load 114) may correspond to the shaft frequency 402 and the second power conditioner 106 may produce the variable frequency AC power signal 422 having a negative 3-phase sequence in order to extend the range of the shaft speed 402. As described previously, in the third region 456, during either the driving mode or the regeneration mode, sub-modes such as continuously changing speed operation or fixed speed operation are applicable.

The resulting shaft frequency 402 described in FIG. 5 may be the same as in FIG. 4. However, by operating in this way, demand on each of the power conditioners 104, 106 may be more evenly distributed. Other benefits may exist.

Figure 6:
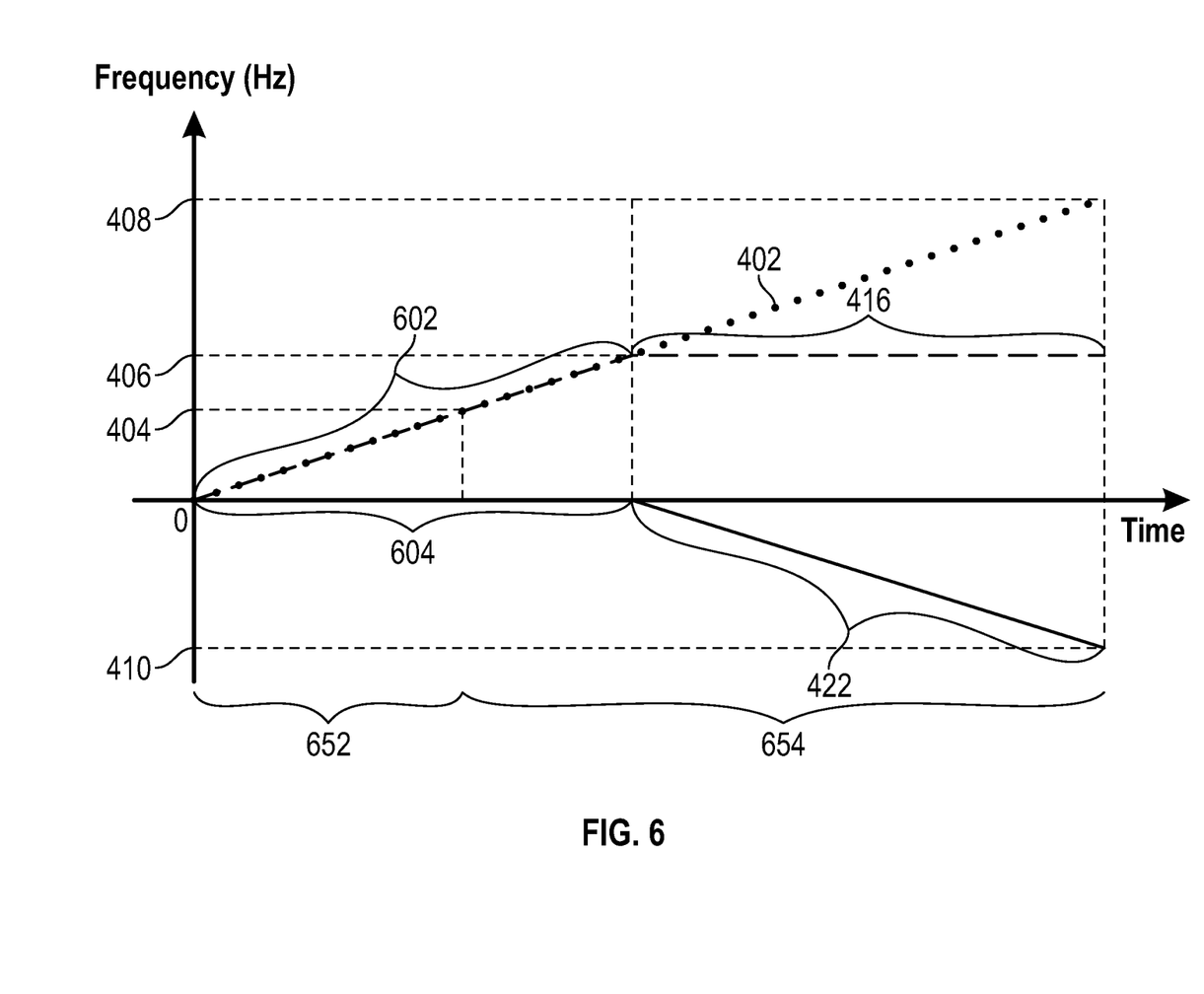
FIG. 6 is a graph depicting an example of relations between power signals and a shaft speed.

Referring to FIG. 6, a graph depicts an example of relationships between power signals and a shaft frequency 402. In a first region 652, the shaft frequency 402 may range from 0 to the maximum operational frequency 406 of the first power conditioner 104. The VFIS motor-generator 102 may be operated as a synchronous motor until the first power conditioner 104 reaches its maximum operational frequency 406.

In a driving mode, while the shaft frequency 402 is less than the maximum operational frequency 406 of the first power conditioner 104, the first power conditioner 104 may generate a constant frequency AC power signal 602 between the minimum regeneration frequency 404 and a maximum operational frequency 406 of the first power conditioner 104. The second power conditioner 106 may generate a DC power signal 604 in order to generate a constant magnetic force and operate the VFIS motor-generator 102 as a synchronous motor.

During a regeneration mode in the first region 652, the shaft frequency 402 may change from the maximum operational frequency 406 of the first power conditioner 104 to the minimum regeneration frequency 404 due to a braking. The frequency of the variable frequency AC power signal 414 (which in the case of regeneration may be produced by rotation of the shaft 250 by the load 114) may correspond to the shaft frequency 402 and the second power conditioner 106 may continually produce the DC power signal 420. As previously described, during either the driving mode or the regeneration mode, sub-modes such as continuously changing speed operation or fixed speed operation may be applicable.

In a second region 654, the shaft frequency 402 may be greater than the maximum operational frequency 406 of the first power conditioner 104, and less than the maximum shaft frequency 408 (or two times the maximum operational frequency 406). In this region, a range of the shaft frequency 402 is considered to be extended because it is greater than the maximum operational frequency 406 of the first power conditioner. In a driving mode, the second region 454 may be referred to as a pseudo-super synchronous mode. In this mode, the shaft frequency 402 may be higher than the operational frequencies of either of the power conditioners 104, 106. In the pseudo-super-synchronous mode, the first power conditioner 104 may generate a constant frequency AC power signal 416 and the second power conditioner 106 may generate a variable frequency AC power signal 422 having a negative 3-phase sequence. Based on the functional relationship described in FIG. 3 the negative 3-phase sequence may be additive with the constant frequency AC power signal 416, enabling the shaft to be operated at a frequency that is higher than the maximum operational frequency 406 of the first power conditioner 104.

For a regeneration mode in the second region 654, the shaft frequency 402 may change from the maximum shaft frequency 408 to the maximum operational frequency 406 due to a vehicle braking process. The frequency of the constant frequency AC power signal 416 (which in the case of regeneration may be produced by rotation of the shaft 250 by the load 114) may correspond to the shaft frequency 402 and the second power conditioner 106 may produce the variable frequency AC power signal 422 having a negative 3-phase sequence in order to extend the range of the shaft speed 402. As described previously, in the second region 654, during either the driving mode or the regeneration mode, sub-modes such as continuously changing speed operation or fixed speed operation are also applicable.

The example of FIG. 6 may enable the operation of the VFIS motor-generator 102 in an extended shaft frequency mode but may be limited in the ability to produce regenerative power when the shaft frequency 402 is lower than the minimum regeneration frequency 404. While some examples are provided in FIGS. 4-6, the application is not intended to be limited only to these operations. Other possible operations of the first power conditioner 104 and the second power conditioner 106 are possible.

Figure 7:
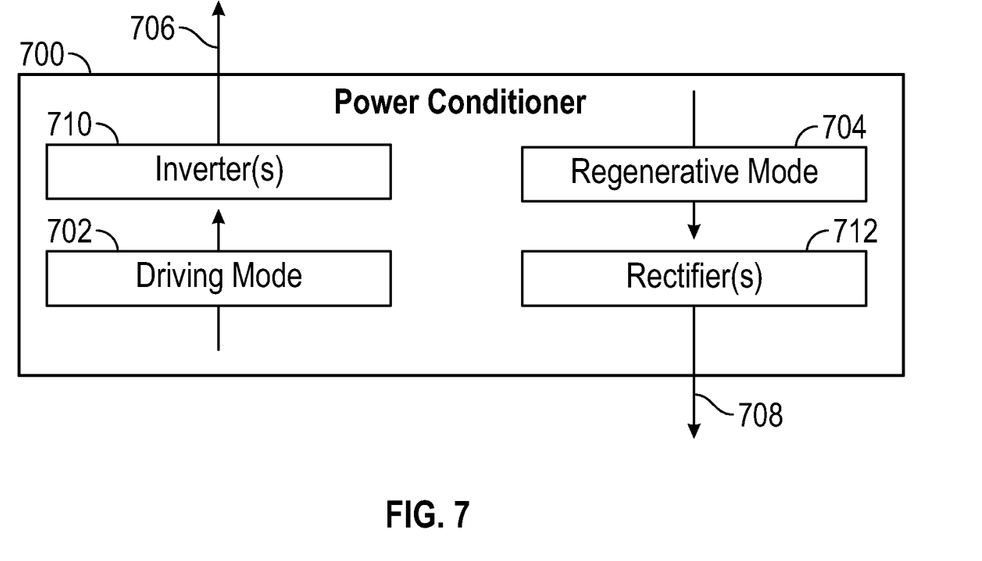
FIG. 7 is a schematic diagram depicting an example of a power conditioner.

Referring to FIG. 7, an example of a power conditioner 700 is depicted. The power conditioner 700 may describe the first power conditioner 104, the second power conditioner 106, or both.

The power conditioner 700 may be configured to operate in a driving mode 702 or in a regenerative mode 704. While in the driving mode 702, the power conditioner 700 may include at least one inverter 710 which may generate an AC power signal 706 for driving a set of windings. The power conditioner 700 may also be configured to operate in a regenerative mode 704. While in the regenerative mode 704, the power conditioner 700 may include at least one rectifier 712 for generating a DC power signal 708 for charging a battery (e.g., the battery 108).

Figure 8:
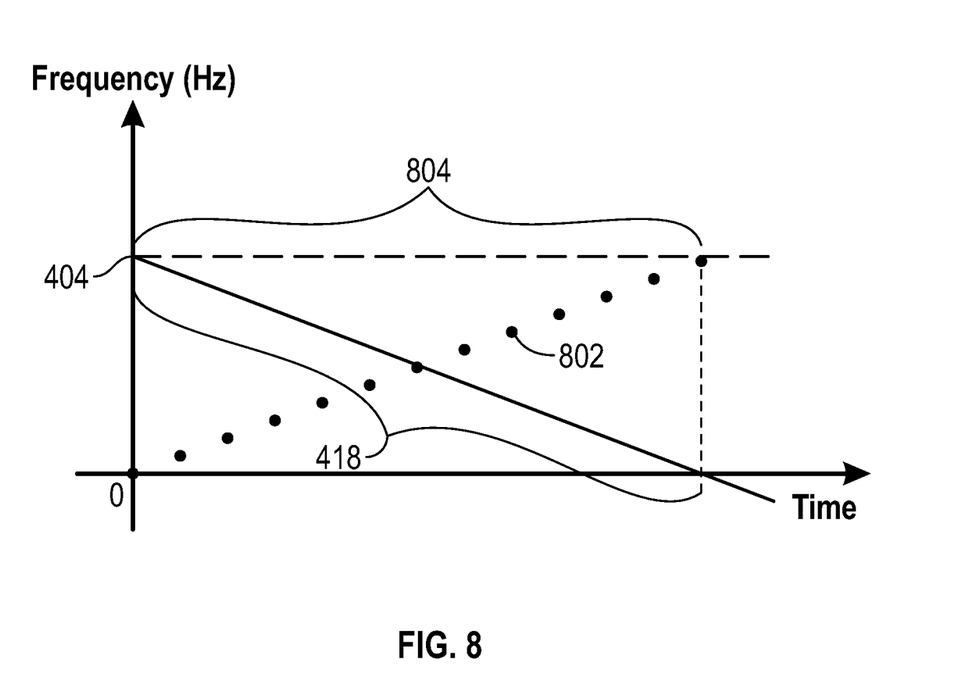
FIG. 8 is a graph depicting an example of relations between power signals and a shaft speed.

FIG. 8 is a graph depicting an example of relations between power signals and a shaft speed. In FIG. 8, a shaft frequency 802 may be back-driven (e.g., in a regenerative mode) to produce a constant frequency AC power signal 804. While FIGS. 4 and 5 may be associated with either a driving mode or a regeneration mode, the example of FIG. 8 is described with respect to regeneration at a shaft frequency 802 that is below the minimum regeneration frequency 404. In this case, the first power conditioner 104 may operate in the regenerative mode 704 and the second power conditioner 106 may generate a variable frequency AC power signal 418 having a positive 3-phase sequence. A combination of the variable frequency AC power signal 418 and the shaft frequency 802 may produce the constant frequency AC power signal 804, which may be greater than or equal to the minimum regeneration frequency 404. The constant frequency AC power signal 804 may be present at the set of stator windings 218 and may be used to produce a power signal to charge the battery 108 of FIG. 2.

Figure 9:
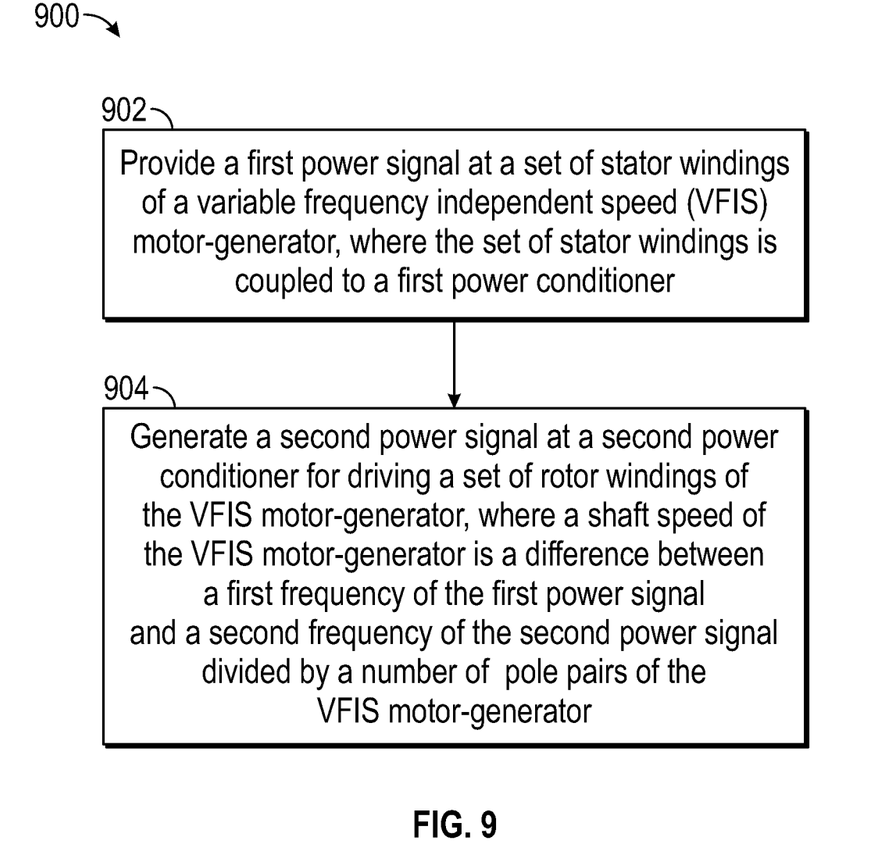
FIG. 9 is a flow chart depicting an example of a method for operating a VFIS motor-generator in an extended speed range.

Referring to FIG. 9, a flow chart depicting an example of a method 900 for operating a VFIS motor-generator in an extended speed range is depicted. The method 900 may include providing a first power signal at a set of stator windings of a VFIS motor-generator, where the set of stator windings is coupled to a first power conditioner, at 902. For example, in a driving mode, the first power signal 302 may be provided by the first power conditioner 104 to the set of stator windings 218. In a regenerative mode, the first power signal 302 may be generated by turning the shaft 250 and, thereby, causing an interaction between the magnetic fields 230, 232.

The method 900 may further include generating a second power signal at a second power conditioner for driving a set of rotor windings of the VFIS motor-generator, where a shaft speed of the VFIS motor-generator is a difference between a first frequency of the first power signal and a second frequency of the second power signal divided by a number of pole pairs of the VFIS motor-generator, at 904. For example, the second power conditioner 106 may generate the second power signal 306.

Although various examples have been shown and described, the present disclosure is not so limited and will be understood to include all such modifications and variations as would be apparent to one skilled in the art.

What is claimed is:

1. A system comprising:
   a variable frequency independent speed (VFIS) motor-generator having a stator with a set of stator windings, a rotor with a set of rotor windings, and a high-frequency transformer having a set of primary windings on the stator and a set of secondary windings on the rotor, wherein the set of secondary windings are coupled to the set of rotor windings;
   a first power conditioner coupled to the set of stator windings, wherein the first power conditioner includes a first inverter capable of alternating current (AC) power generation and a first rectifier capable of direct current (DC) power generation; and
   a second power conditioner, distinct from the first power conditioner, coupled to the set of primary windings, wherein the second power conditioner includes a second inverter capable of AC power generation.

2. The system of claim 1, wherein a first power signal generated by the first power conditioner induces a first rotating magnetic field at the set of stator windings while the first power conditioner is in a driving mode, wherein a second power signal generated by the second power conditioner induces a second rotating magnetic field at the set of rotor windings, and wherein a shaft speed is based on a difference between a first frequency of the first power signal and a second frequency of the second power signal.

3. The system of claim 2, wherein the shaft speed is the difference between the first frequency and the second frequency divided by a number of pole pairs.

4. The system of claim 2, wherein the first power conditioner is configured to increase the shaft speed over time or wherein the first power conditioner is configured to keep the shaft speed constant over time.

5. The system of claim 1, wherein the first power conditioner, while in a driving mode, is configured to generate a first AC power signal at the first inverter while a shaft frequency is within a first region that is less than a minimum regeneration frequency, the first AC power signal having a frequency that is constant relative to a shaft frequency, and wherein the second power conditioner is configured to generate a second AC power signal at the second inverter while the shaft frequency is within the first region that is less than the minimum regeneration frequency, the second AC power signal having a frequency that is variable relative to the shaft frequency and having a positive 3-phase sequence.

6. The system of claim 1, wherein the first power conditioner, while in a regenerative mode, is configured to generate a DC power signal at the first rectifier, wherein the second power conditioner is configured to generate an AC power signal at the second inverter while a shaft frequency is within a first region that is less than a minimum regeneration frequency, the AC power signal having a frequency that is variable relative to the shaft frequency and having a positive 3-phase sequence, and wherein the AC power signal added to the shaft frequency is greater than or equal to the minimum regeneration frequency.

7. The system of claim 1, wherein the first power conditioner, while in a driving mode, is configured to generate an AC power signal at the first inverter while a shaft frequency is within a second region that is greater than a minimum regeneration frequency and less than a maximum operational frequency of the first power conditioner, the AC power signal having a frequency that is variable relative to the shaft frequency, and wherein the second power conditioner is configured to generate a DC power signal while the shaft frequency is within the second region that is greater than the minimum regeneration frequency and less than the maximum operational frequency.

8. The system of claim 1, wherein the first power conditioner, while in a regenerative mode, is configured to generate a first DC power signal at the first rectifier, and wherein the second power conditioner is configured to generate a second DC power signal while a shaft frequency is within a second region that is greater than the minimum regeneration frequency and less than the maximum operational frequency.

9. The system of claim 1, wherein the first power conditioner, while in a driving mode, is configured to generate a first AC power signal at the first inverter while a shaft frequency is within a third region that is greater than the maximum operational frequency, the first AC power signal having a frequency that is constant relative to the shaft frequency, and wherein the second power conditioner is configured to generate a second AC power signal at the second inverter while the shaft frequency is within the third region that is greater than the maximum operational frequency, the second AC power signal having a frequency that is variable relative to the shaft frequency and having a negative 3-phase sequence.

10. The system of claim 1, wherein the first power conditioner, while in a regenerative mode, is configured to generate a DC power signal at the first rectifier, and wherein the second power conditioner is configured to generate an AC power signal at the second inverter while a shaft frequency is within a third region that is greater than the maximum operational frequency, the second AC power signal having a frequency that is variable relative to the shaft frequency and having a negative 3-phase sequence.

11. The system of claim 1, wherein the first power conditioner, while in a driving mode, is configured to generate a first AC power signal at the first inverter while a shaft frequency is within a second region that is greater than the minimum regeneration frequency, the first AC power signal having a frequency that is variable relative to the shaft frequency, and wherein the second power conditioner is configured to generate a second AC power signal at the second inverter while the shaft frequency is within the second region that is greater than the minimum regeneration frequency, the second AC power signal having a frequency that is variable relative to the shaft frequency and having a negative 3-phase sequence.

12. The system of claim 1, wherein the first power conditioner, while in a regenerative mode, is configured to generate a DC power signal at the first rectifier, wherein the second power conditioner is configured to generate an AC power signal at the second inverter while a shaft frequency is within a second region that is greater than the minimum regeneration frequency, the AC power signal having a frequency that is variable relative to the shaft frequency and having a negative 3-phase sequence.

13. The system of claim 1, wherein the first power conditioner, while in a driving mode, is configured to generate an AC power signal at the first inverter while a shaft frequency is within a first region that is less than the maximum operational frequency of the first power conditioner, the AC power signal having a frequency that is variable relative to the shaft frequency, and wherein the second power conditioner is configured to generate a DC power signal while the shaft frequency is within the first region that is less than the maximum operational frequency.

14. The system of claim 1, wherein the first power conditioner, while in a regenerative mode, is configured to generate a first DC power signal at the first rectifier, and wherein the second power conditioner is configured to generate a second DC power signal while a shaft frequency is within a first region that is less than the maximum operational frequency.

15. The system of claim 1, further comprising:
an encoder configured to measure a shaft phase and a shaft frequency and to communicate the shaft phase and the shaft frequency to the first power conditioner and the second power conditioner.

16. A system comprising:
a variable frequency independent speed (VFIS) motor-generator having a stator with a set of stator windings and a rotor with a set of rotor windings;
a first power conditioner configured to generate a first power signal for driving the set of stator windings when operating in a driving mode and configured to generate a direct current (DC) power signal for battery charging when operating in a regenerative mod$_e$z wherein the first power conditioner includes a first inverter capable of alternating current (AC) power generation and a first rectifier capable of direct current (DC) power generation; and
a second power conditioner configured to generate a second power signal for driving the set of rotor windings, wherein the second power conditioner includes a second inverter capable of AC power generation.

17. The system of claim 16, further comprising:
a high-frequency transformer including a set of primary windings positioned on the stator and a set of secondary windings positioned on the rotor, wherein the second power signal is communicated to the set of rotor windings via the high-frequency transformer.

18. A method comprising:
providing a first power signal at a set of stator windings of a variable frequency independent speed (VFIS) motor-generator, wherein the set of stator windings is coupled to a first power conditioner, and wherein the first power conditioner includes a first inverter capable of alternating current (AC) power generation and a first rectifier capable of direct current (DC) power generation; and
generating a second power signal at a second power conditioner for driving a set of rotor windings of the VFIS motor-generator, wherein the second power conditioner includes a second inverter capable of AC power generation, and wherein a shaft speed of the VFIS motor-generator is a difference between a first frequency of the first power signal and a second frequency of the second power signal divided by a number of pole pairs of the VFIS motor-generator.

19. The method of claim 18, wherein the first power signal is a driving alternating current (AC) power signal, wherein a shaft frequency is greater than a maximum operational frequency of the first power conditioner, and wherein the second power signal is an AC power signal having a negative 3-phase sequence.

20. The method of claim 18, wherein the first power signal is a regenerative AC power signal, wherein a shaft frequency is less than a minimum regeneration frequency, and wherein the second power signal is an AC power signal having a positive 3-phase sequence.

* * * * *

UNITED STATES PATENT AND TRADEMARK OFFICE
CERTIFICATE OF CORRECTION

PATENT NO. : 11,848,634 B2
APPLICATION NO. : 17/668564
DATED : December 19, 2023
INVENTOR(S) : Gao et al.

It is certified that error appears in the above-identified patent and that said Letters Patent is hereby corrected as shown below:

In the Claims

Column 15, Line 26-Column 16, Line 2 Claim 16 should read:
16. A system comprising:
a variable frequency independent speed (VFIS) motor-generator having a stator with a set of stator windings and a rotor with a set of rotor windings;
a first power conditioner configured to generate a first power signal for driving the set of stator windings when operating in a driving mode and configured to generate a direct current (DC) power signal for battery charging when operating in a regenerative mode, wherein the first power conditioner includes a first inverter capable of alternating current (AC) power generation and a first rectifier capable of direct current (DC) power generation; and
a second power conditioner configured to generate a second power signal for driving the set of rotor windings, wherein the second power conditioner includes a second inverter capable of AC power generation.

Signed and Sealed this
Thirtieth Day of April, 2024

Katherine Kelly Vidal
*Director of the United States Patent and Trademark Office*